(12) United States Patent
Dotz et al.

(10) Patent No.: US 12,328,047 B2
(45) Date of Patent: Jun. 10, 2025

(54) STATOR FOR AN ELECTRIC MACHINE, DRIVE INSTALLATION FOR AN ELECTRIC VEHICLE, AND VEHICLE

(71) Applicant: Valeo eAutomotive Germany GmbH, Erlangen (DE)

(72) Inventors: Boris Dotz, Erlangen (DE); Daniel Fritsch, Erlangen (DE)

( * ) Notice: Subject to any disclaimer, the term of this patent is extended or adjusted under 35 U.S.C. 154(b) by 229 days.

(21) Appl. No.: 18/055,905

(22) Filed: Nov. 16, 2022

(65) Prior Publication Data
US 2023/0155436 A1 May 18, 2023

(30) Foreign Application Priority Data

Nov. 16, 2021 (EP) .................................... 21208428

(51) Int. Cl.
*H02K 3/28* (2006.01)
*H02K 5/20* (2006.01)
*H02K 7/116* (2006.01)

(52) U.S. Cl.
CPC .............. *H02K 3/28* (2013.01); *H02K 5/207* (2021.01); *H02K 7/116* (2013.01); *H02K 2205/09* (2013.01)

(58) Field of Classification Search
None
See application file for complete search history.

(56) References Cited

U.S. PATENT DOCUMENTS

| | | | |
|---|---|---|---|
| 2017/0353071 A1* | 12/2017 | Saito | H02K 3/28 |
| 2019/0027977 A1* | 1/2019 | Saito | H02K 3/48 |

* cited by examiner

*Primary Examiner* — Bernard Rojas
(74) *Attorney, Agent, or Firm* — Osha Bergman Watanabe & Burton LLP (57) ABSTRACT

A stator having a stator core which has two end sides disclosed. A multiplicity of grooves are configured in the stator core. A stator winding occupies a plurality of winding zones in the grooves, a number of N strands has a number of $2 \cdot P$ poles, and the number of grooves is $2 \cdot P \cdot N \cdot q$, where $q \geq 2$. Each winding zone extends across at least $q+1$ of the grooves, and each winding zone is radially subdivided into first to $L^{th}$ layers. The layers configure first to $(L/2)^{th}$ double layers, and a number of the double layers is less than the number of the other double layers. Each winding zone in the circumferential direction is subdivided into first to $q^{th}$ sub-winding zones, and a respective phase winding for one of the strands has at least one sub-winding which configures a current path and comprises internal portions that are disposed within the grooves.

12 Claims, 10 Drawing Sheets

STATOR FOR AN ELECTRIC MACHINE, DRIVE INSTALLATION FOR AN ELECTRIC VEHICLE, AND VEHICLE

The present invention relates to a stator for an electric machine. The invention moreover relates to a drive installation for an electric vehicle, and to a vehicle.

In electrically driven vehicles, an ideally smooth delivery of torque, i.e., a delivery of torque with as few ripples as possible, is desirable in order to achieve a positive NVH (noise, vibration, harshness) behaviour. This can be achieved in particular by way of minor torque ripples and minor parasitic forces in an electric machine of the drive installation. In the case of stator windings of a stator of the electric machine, a required number of windings are to be disposed symmetrically, with a minor winding overhang, and so as to be easy to connect and in a production-friendly manner with a view to automated production with a high level of process reliability, in a stator core of the stator.

The invention is based on the object of specifying an option for driving a vehicle with minor torque ripples.

This object is achieved according to the invention by a stator for an electric machine, having a stator core which extends along a longitudinal axis, has an end side and a further end side that lies opposite the end side, and having a stator winding, wherein a multiplicity of grooves that are disposed in the circumferential direction are configured in the stator core; wherein the stator winding occupies a plurality of winding zones in the grooves; wherein the stator winding has a number of N strands and a number of 2·P poles, and the number of grooves is 2·P·N·q, where P, N and q are natural numbers and q≥2; wherein each winding zone extends across at least q+1 of the grooves; wherein each winding zone is radially subdivided into $1^{st}$ to $L^{th}$ layers which are designated according to their sequence in the radial direction; wherein the layers configure $1^{st}$ to $(L/2)^{th}$ double layers, wherein the $i^{th}$ double layer comprises the $(2i-1)^{th}$ and the $(2i)^{th}$ layer for all $1 \leq i \leq (L/2)$, where $L \geq 6$ and is even, where L and i are natural numbers; wherein a number of the double layers, being less than the number of the other double layers, is displaced by at least one groove counter to the pre-defined circumferential direction in relation to the other double layers; wherein each winding zone in the circumferential direction is subdivided into first to $q^{th}$ sub-winding zones which comprise in each case all layers and are designated according to their sequence in the circumferential direction; wherein the stator winding for a respective strand has a phase winding; wherein the phase winding comprises at least one sub-winding which configures a current path and comprises internal portions that are disposed within the grooves, and connection portions that are disposed on the end sides of the stator core and in each case connect in an electrically conductive manner two internal portions which are directly successive in terms of the current path.

The stator according to the invention for an electric machine has a stator core. The stator core extends along the longitudinal axis. The stator core has an end side and a further end side. The further end side lies opposite the end side. The stator has a stator winding. A multiplicity of grooves are configured in the stator core. The grooves are disposed in the circumferential direction. The stator winding occupies a plurality of winding zones in the grooves. The stator winding has a number of N strands and a number of 2·P poles. The number of grooves is 2·P·N·q. P, N and q are natural numbers. q is greater than two. Each winding zone extends across at least q+1 of the grooves. Each winding zone is radially subdivided into first to $L^{th}$ layers. L is greater than six and is even. The layers are designated according to their sequence in the radial direction. The layers configure first to $(L/2)^{th}$ double layers. The $i^{th}$ double layer comprises the $(2i-1)^{th}$ and the $(2i)^{th}$ layer for all $1 \leq i \leq (L/2)$. L and i are natural numbers. L is greater than six and is even. A number of the double layers, being less than the number of the other double layers, is displaced by at least one groove counter to the pre-defined circumferential direction in relation to the other double layers. Each winding zone in the circumferential direction is subdivided into first to $q^{th}$ sub-winding zones. The sub-winding zones comprise in each case all layers. The sub-winding zones are designated according to their sequence in the circumferential direction. The stator winding for a respective strand has a phase winding. The phase winding comprises at least one sub-winding which configures a current path. The sub-winding has internal portions that are disposed within the grooves, and connection portions that are disposed on the end sides of the stator core. The connection portions connect in each case in an electrically conductive manner two internal portions which are directly successive in terms of the current path.

The invention is based on the concept that in the case of the winding zones being occupied in a non-uniform manner, a more favourable NVH behaviour is achieved in one rotation direction than along the other rotation direction of the rotating rotor movement. Such a disposal of the double layers may also be referred to as a non-uniform pitch of the stator winding. Since the double layers in part are displaced along the pre-defined circumferential direction, slight torque ripple can be achieved along a rotation direction of the electric machine. In this way, particularly smooth running of the electric machine can be achieved while, at the same time, the stator winding is symmetrically disposed in the grooves.

The stator core is typically configured from a multiplicity of individual sheets which are disposed in a stack and/or mutually isolated. To this extent, the stator core can also be referred to as laminated stator core. The cross-sectional plane is defined in particular by the radial direction and by the circumferential direction. The radial division runs in particular on a plane that is defined by the longitudinal axis and the radial direction.

Each winding zone preferably extends across at least two grooves, particularly preferably across at least three grooves, or at least four groups. Portions of the stator winding that are associated with the same phase of the electric machine are typically disposed in each winding zone.

The number of layers can be 6, 8, 10, 12, 14 or 16. In particular, a radially outer double layer, a radially inner double layer or a radially central double layer may be displaced.

Each winding zone, in a cross-sectional plane that is perpendicular to the longitudinal axis, by way of a centric radial division can be subdivided into a first side and into a second side. The second side here can succeed the first side along a pre-defined circumferential direction, and each winding zone on the first side can occupy a smaller cross-sectional area of the grooves than on the second side. The division can run through the $[(x+1)/2]^{th}$ groove of a respective winding zone when x is odd, and run so as to be centric between the $(x/2)^{th}$ and the $[(x/2)+1]^{th}$ groove of a respective winding zone when x is even, x describing the number of grooves occupied by a respective winding zone.

The stator winding in the drive installation according to the invention can be configured as a round-wire winding.

Alternatively, the stator winding can be configured as a shaped conductor winding, in particular as a hairpin winding. The stator winding in a shaped conductor winding is configured by a multiplicity of shaped conductors which configure a current path, or a plurality of current paths, for a current which for generating the rotating field passes through the stator winding. The shaped conductors can be configured from a metal rod and/or have a rectangular or radiused rectangular cross section. Each part, or one part, of the shaped conductor preferably has two straight portions which extend in the axial direction within a respective groove. The straight portions can be connected to one another by a coil end portion on a first end side of the stator core. Each straight portion on a further end side of the stator core can be adjoined by an end portion. The straight portions are preferably configured so as to be integral to the coil end portion and/or to the end portions. The end portions of two respective shaped conductors are preferably mechanically connected to one another in an electrically conductive and materially integral manner, in particular by welding, so as to configure the stator are winding. Moreover, one part of the shaped conductors, in particular for connecting the stator winding to a phase connector and/or to one or a plurality of neutral points provided shaped conductor, can have a straight portion, a connector portion on the first end side, and an end portion on the further end side.

A straight portion of one of the shaped conductors can be disposed in each layer. The internal portions can be configured by the straight portions of the shaped conductors. The connection portions on the first end side can be configured by the end coil portions of the shaped conductors. The connection portions on the further end side can be configured by the connected end portions of two different shaped conductors.

The stator winding can have a neutral point. The at least one sub-winding of a respective strand can be wired so as to form the neutral point. The stator winding can also have two neutral points and a plurality of sub-windings for each strand. In this instance, one of the sub-windings of a respective strand can be wired so as to form one of the neutral points, and another one of the sub-windings of a respective strand can be wired so as to form the other of the neutral points.

According to one first variant of design embodiment, the sub-winding can comprise a plurality of conductor sequences of internal portions which are successive in terms of the current path; wherein each conductor sequence is disposed in one of the double layers and configures a full encirclement of the stator core. In this way, a wave winding can be configured as a stator winding.

It is also preferable for first to $(L/2)^{th}$ of the conductor sequences to run in each case along a circumferential direction, in particular along the pre-defined circumferential direction, wherein $[(L/2)+1]^{th}$ to $L^{th}$ of the conductor sequences run in each case along a further circumferential direction that is counter to the circumferential direction. The wave winding can be wound in the opposite direction as a result.

In a refinement it can be provided that each conductor sequence which directly succeeds another conductor sequence in terms of the current path is disposed in a different sub-winding zone than the other conductor sequence.

In the first variant of design embodiment it is furthermore preferable for a further sub-winding, which corresponds to the sub-winding, to be provided; wherein a respective internal portion of the further sub-winding that lies in the same layer of the same winding zone as an internal portion of the sub-winding, is disposed in a different sub-winding zone than the sub-winding zone in which the internal portion of the sub-winding lies. To this extent, the sub-winding can also be referred to as the first sub-winding, and the further sub-winding can be referred to as the second sub-winding.

A second and a third variant of design embodiment will be described hereunder.

In order for a combined loop/wave winding to be formed in the second and the third variant of design embodiment, it can be provided that one of the at least one sub-winding comprises a set of first to $P^{th}$ conductor sequences of the first type that are successive in the sequence of their designation in terms of the current path and are in each case disposed in first to fourth directly adjacent winding zones for the same strand. Each conductor sequence of the first type preferably comprises first to $(L/2)^{th}$ pairs of one first of the internal portions and one second of the internal portions, wherein the pairs are designated according to their sequence along the current path. The first and the second internal portions can be disposed in different layers of the same double layer. It is preferable here for the first pair to be disposed in the first double layer, wherein the second pair is disposed in the $(L/2)^{th}$ double layer, wherein the third pair is disposed in the second double layer, or the third to $(L/2)^{th}$ pairs are disposed in the second to $[(L/2)-1]^{th}$ double layer. The third winding zone, in which the internal portions of the first to $(P-1)^{th}$ conductor sequences is disposed, can be the first winding zone in which the conductor sequence that succeeds the conductor sequence in terms of the current path is disposed. The fourth winding zone, in which the internal portions of the first to $(P-1)^{th}$ conductor sequences are disposed, can be the second winding zone in which the conductor sequence that succeeds the conductor sequence in terms of the current path is disposed. This sub-winding can also be referred to as the first sub-winding.

Alternatively or additionally, it can be provided in the second and the third variant of design embodiment that one of the at least one sub-winding comprises a set of first to $P^{th}$ conductor sequences of the second type that are successive in the sequence of their designation in terms of the current path and are in each case disposed in two directly adjacent winding zones for the same strand. It is preferably provided that each conductor sequence of the second type comprises first to $(L/2)^{th}$ pairs of one first of the internal portions and one second of the internal portions, and the pairs are designated according to their sequence along the current path. The first and the second internal portions here can be disposed in different layers of the double layer corresponding to the designation of the pair. It is preferably provided that the first to $(P-1)^{th}$ conductor sequences of the second type by way of one of the connection portions are connected to the succeeding conductor sequence of the second type along the current path, and the succeeding conductor sequence of the second type is disposed in two directly adjacent winding zones for the same strand. This sub-winding can also be referred to as the second sub-winding.

The sub-windings preferably run about the stator core in opposite circumferential directions.

In the second variant of design embodiment it can be provided that the first internal portion of the pairs of the conductor sequences of the or of a respective sub-winding is disposed in one of the layers of the double layer, and the second internal portion of the pairs of the conductor sequences of the or of a respective sub-winding is disposed in the other one of the layers of the double layer.

In the third variant of design embodiment, the first internal portion of the pairs with an odd-numbered designation of the conductor sequences of the or of a respective sub-winding can be disposed in one of the layers of the double layer; the second internal portion of the pairs with an odd-numbered designation of the conductor sequences of the or of a respective sub-winding can be disposed in the other layer of the double layer; the first internal portion of the pairs with an even-numbered designation of the conductor sequences of the or of a respective sub-winding can be disposed in the other layer of the double layer; and the second internal portion of the pairs with an even-numbered designation of the conductor sequences of the or of a respective sub-winding can be disposed in the one layer of the double layer.

In a preferred design embodiment it can furthermore be provided that the or a respective sub-winding comprises in total q sets of the conductor sequences which are in each case disposed in the same sub-winding zone; wherein each set that directly succeeds another set of the same sub-winding in terms of the current path, is disposed in a different sub-winding zone than the other set.

The object on which the invention is based is furthermore achieved by a drive installation for an electric vehicle, having: a stator according to the invention, wherein the stator is specified for generating a rotating magnetic field; a converter installation for converting magnetic energy of the rotating field into a rotating output movement of the drive installation; wherein the converter installation has a rotor which conjointly with the stator configures a rotating electric machine such that the rotor is able to be set in a rotating rotor movement which as a function of the rotating field is able to be selectively set to one of two opposite rotation directions; and a transmission portion which is specified for transmitting the rotating rotor movement to the rotating output movement, wherein the converter installation as the preferred rotation direction has one of the two rotation directions of the rotating rotor movement, wherein the preferred rotation direction corresponds to the pre-defined circumferential direction.

The rotor can be permanently excited or not permanently excited. The rotor can be separately excited. The rotor can be magnetically excited or voltage-excited. The transmission portion is in particular also specified to convert the rotating rotor movement into the rotating output movement. The rotation directions of the rotating rotor movement can also be understood to be orientations of the rotating rotor movement so that the preferred rotation direction corresponds to a preferred orientation.

The preferred rotation direction may be pre-defined in various ways. In general, a presence of the preferred rotation direction of the rotating rotor movement can initiate the vehicle to travel forward, and a presence of the other rotation direction of the rotating rotor movement can initiate the vehicle to travel in reverse.

It is possible for an efficiency of the transmission portion in the preferred rotation direction to be higher than in the other rotation direction. In other words, the transmission portion can be specified in such a manner that the transmission of the rotating rotor movement to the rotating output movement in the presence of the preferred rotation direction is more efficient than in the presence of the other rotation direction of the rotating rotor movement. For example, mechanical losses of the transmission portion are less in the presence of the preferred rotation direction than in the presence of the other rotation direction.

It can also be provided that the transmission portion has a gearbox having an asymmetrical design embodiment that determines the preferred rotation direction. For example, a respective tooth of mutually meshing gear wheels of the gearbox can thus be of an asymmetrical configuration.

The drive installation can furthermore have a control installation for the transmission portion, which for the preferred rotation direction has a larger number of selectable operating modes than for the other one of the rotation directions. A larger number of operating modes can thus be provided for the forward travel than for the travel in reverse.

It is also possible for the drive installation to have a ventilation installation which in the preferred rotation direction has a higher cooling efficiency than in the other one of the rotation directions. For example, the higher cooling efficiency can be derived from the position of an air intake, the latter in the presence of the preferred rotation direction receiving headwind.

The object on which the invention is based is furthermore achieved by a vehicle comprising a drive installation according to the invention, which is specified for driving the vehicle.

The preferred rotation direction may also be pre-defined by an installed position of the drive installation in a vehicle body. The rotating output movement preferably acts on an axle and/or on wheels of the vehicle.

A winding zone contains only parts of the stator winding of the same strand, i.e. U, V or W.

Figure 1:
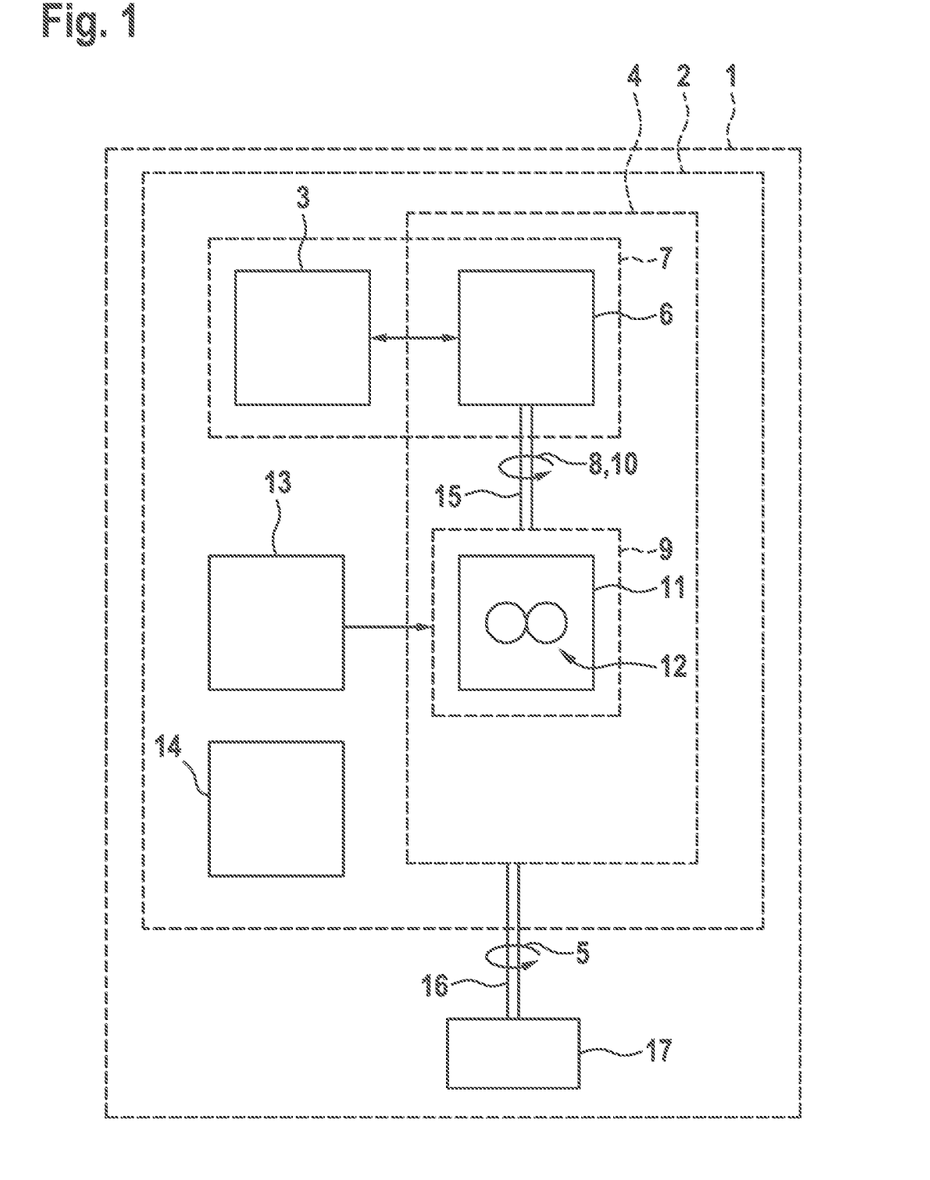
FIG. 1 shows a diagram of an exemplary embodiment of the vehicle according to the invention, having a first exemplary embodiment of the drive installation according to the invention.

Further advantages and details of the present invention are derived from the exemplary embodiments described hereunder as well as by means of the drawings. The latter are schematic illustrations in which:

FIG. 1 shows a schematic diagram of an exemplary embodiment of a vehicle 1, having a first exemplary embodiment of a drive installation 2.

The drive installation 2 has a stator 3 which is specified to generate a rotating magnetic field. Moreover, the drive installation 2 has a converter installation 4 for converting magnetic energy of the rotating field into a rotating output movement 5 of the drive installation 2.

The converter installation 4 has a rotor 6 which conjointly with the stator 3 configures a rotating electric machine 7 so that the rotor 6 can be set in a rotating rotor movement 8. Moreover, the converter installation 4 has a transmission portion 9 which is specified for transmitting and converting the rotating rotor movement 8 into the rotating output movement 5.

The transmission portion 9 has one of two rotation directions of the rotating rotor movement 8 as the preferred rotation direction 10. The latter is derived in particular in that an efficiency of the transmission portion 9 is higher in the preferred rotation direction 10 than in the other one of the rotation directions. Accordingly, the transmission portion 9 is specified in such a manner, for example, that the transmission of the rotating rotor movement 8 to the rotating output movement 5 is more efficient in the presence of the rotation direction 10 than in the presence of the other rotation direction of the rotating rotor movement 8.

The preferred rotation direction 10 can also be derived in that the transmission portion 7 has a gearbox 11 having an asymmetrical design embodiment that defines the rotation direction 9. To this end, the respective tooth of mutually meshing gear wheels 12 of the gearbox 11 can be of an asymmetrical configuration. Likewise, the preferred rotation direction 9 can be derived in that the drive installation 2 has a control installation 13 for the transmission portion 9, that for the preferred rotation direction 10 has a larger number of selectable operating modes than for the other one of the rotation directions. In this way, a larger number of operating modes can be provided for the forward travel of the vehicle 1 than for the travel in reverse of said vehicle 1. Furthermore, the preferred rotation direction 9 can be derived in that the drive installation 2 has a ventilation installation 14 which in the preferred rotation direction 10 has a higher cooling efficiency than in the other one of the rotation directions. Moreover, the preferred rotation direction 10 can also be derived from an installed position of the drive installation 2 in the vehicle 1.

As is furthermore shown in FIG. 1, the rotating rotor movement 8 by way of a shaft 15 of the drive installation 2 acts on the transmission portion 9. The rotating output movement 5 by way of an axle 16 of the vehicle 1 acts on the wheels 17 on of the latter.

The stator 3 corresponds to one of the exemplary embodiments described hereunder.

Figure 2:
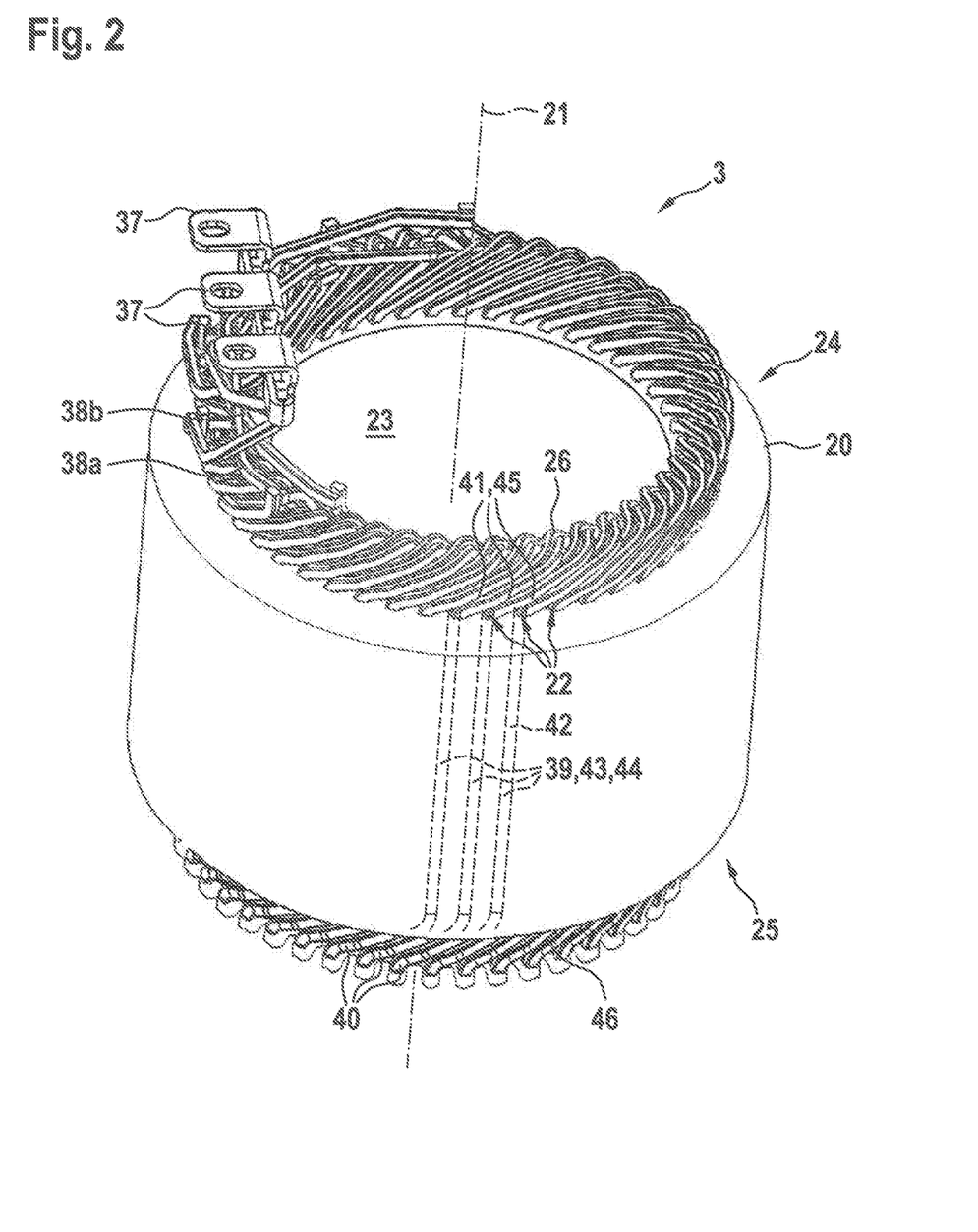
FIG. 2 shows a perspective view of a first exemplary embodiment of a stator according to the invention.

FIG. 2 shows a perspective view of a stator 3 according to the first exemplary embodiment.

The stator 3 has a stator core 20 which extends along a longitudinal axis 21 and in which a multiplicity of grooves 22 disposed in the circumferential direction are configured. The stator core 20 here in an exemplary manner surrounds a receptacle space 23 for the rotor 6 (see FIG. 1) and has a first end side 24 and a second end side 25 lying opposite said first end side 24. Moreover, the stator 3 has a stator winding 26.

Figure 3:
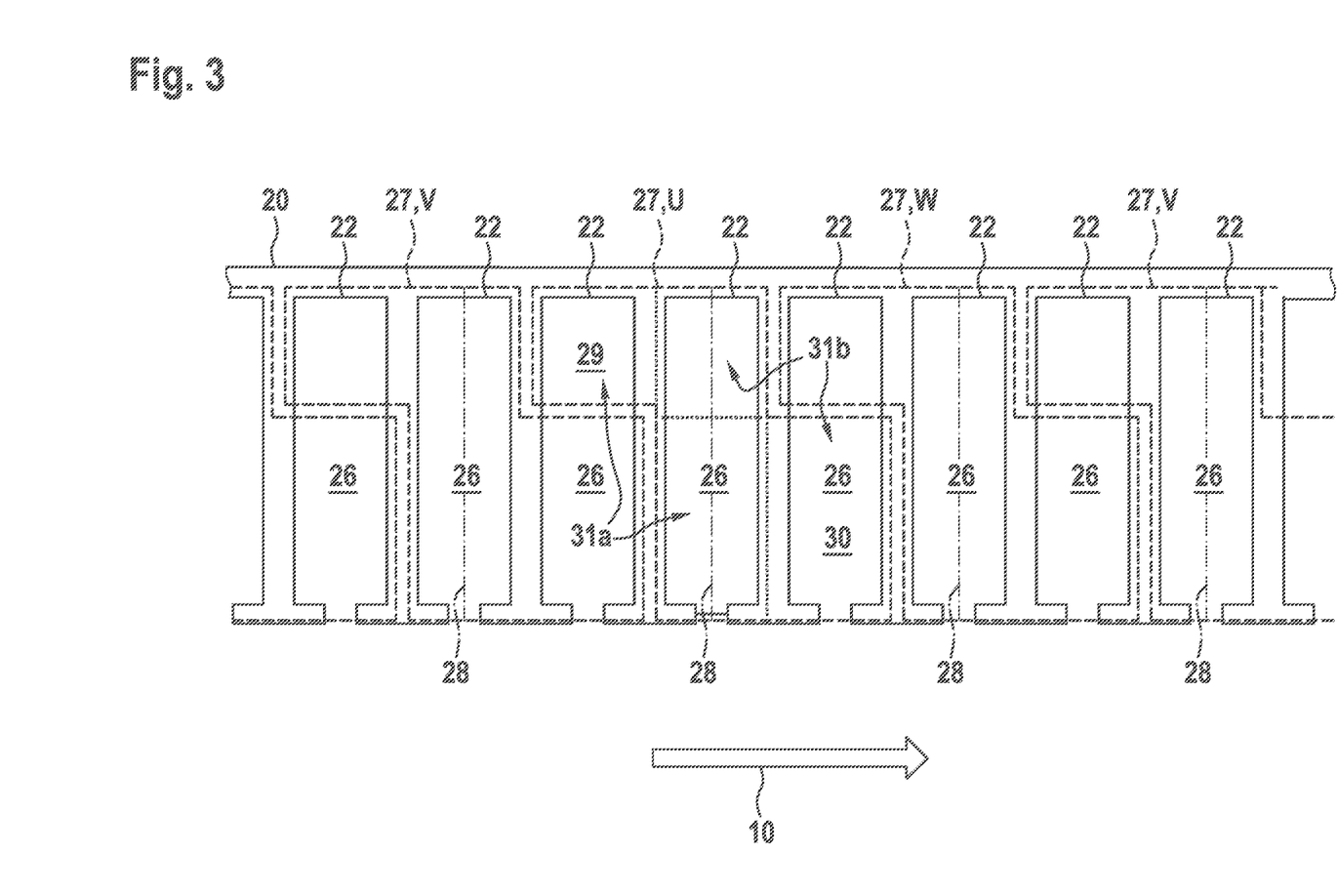
FIG. 3 shows a schematic diagram of the stator winding disposed in the stator core, according to the first exemplary embodiment.

FIG. 3 shows a schematic diagram of the stator winding 26 disposed in the stator core 20.

The stator winding occupies a plurality of windings zones 27 in the grooves 22. Each winding zone here in a cross-sectional plane that is perpendicular to the longitudinal axis 21 (see FIG. 2) and corresponds to the plane of the drawing in FIG. 3, is subdivided by a centric radial division 28 into a first side 29 and into a second side 30. In the present exemplary embodiment, each winding zone 27 in an exemplary manner extends across three grooves 22 such that the division 28 runs so as to be centric through the second of the three grooves 22 of the winding zone 27.

The second side 30 along the preferred rotation direction 10 is successive to the first side 29. As can be seen, each winding zone 27 on the first side 29 occupies a smaller cross-sectional area of the grooves 22 that on the second side 30.

It can furthermore be seen in FIG. 3 that the stator winding 26 has N=3 strands U, V, W for a respective phase of the electric machine 7 (see FIG. 1). Each winding zone 27 contains only proportions of the stator winding 26 of the same strand U, V, W. A hole count q of the stator winding 26 in the present exemplary embodiment is two. Each winding zone 27 presently extends across a number of grooves 22, said number being q+1. Moreover, each winding zone 27 is sub-divided into first to qth sub-winding zones 31a, 31b, specifically into a first sub-winding zone 31a and into a second sub-winding zone 31b.

Figure 4:
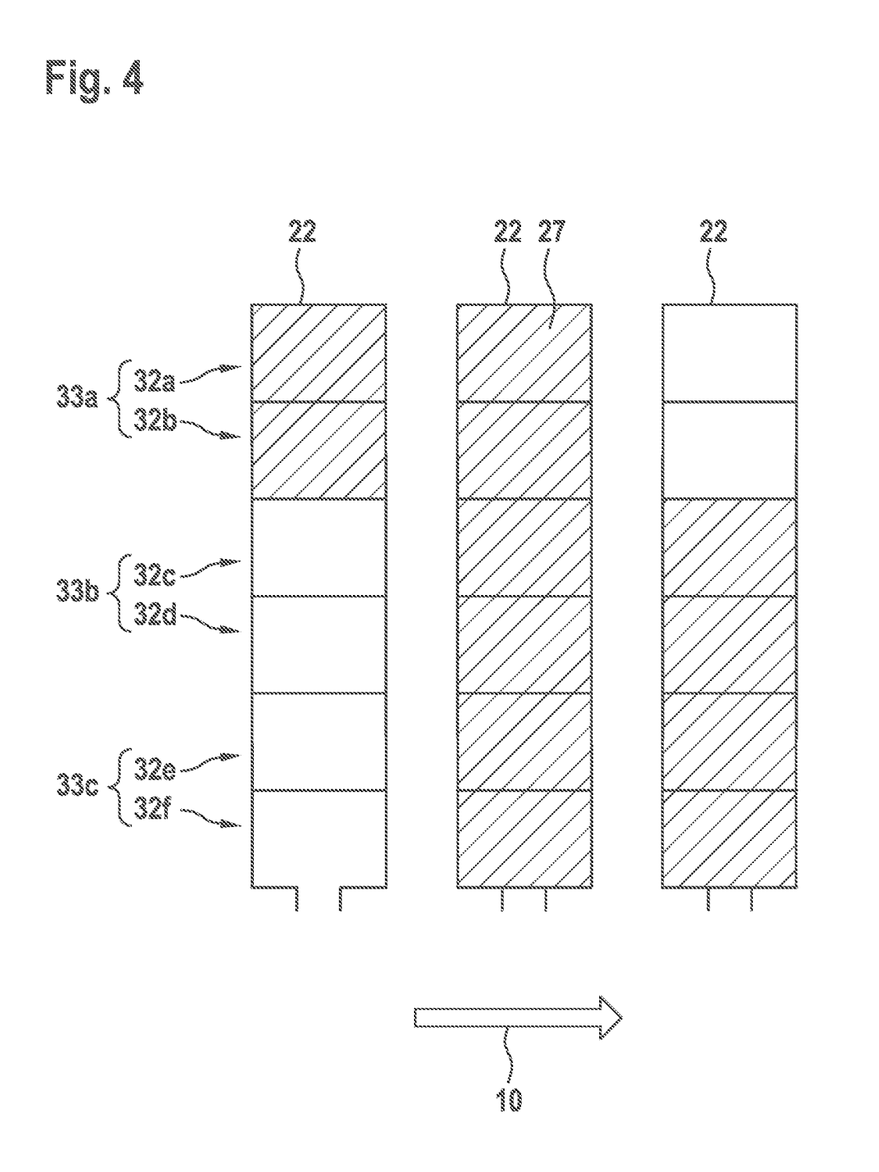
FIG. 4 shows a schematic diagram of a winding zone in the grooves, according to the first exemplary embodiment.

FIG. 4 shows a schematic diagram of a winding zone 27 in the grooves 22.

Each winding zone 27, which in FIG. 3 is identified by a hatched area, is radially sub-divided into first to sixth ($L^{th}$) layers 32a-f, the latter being designated according to their sequence in the radial direction from radially outside to radially inside. The layers 32a-f form first to third [$(L/2)^{th}$] double layers 33a-d, wherein the $i^{th}$ double layer comprises the $(2i-1)^{th}$ and the $(2i)^{th}$ layer for all $1 \leq i \leq (L/2)$. Accordingly, the first double layer 33a comprises the first layer 32a and the second layer 32b, the second double layer 33b comprises the third layer 32c and the fourth layer 32d, and the third double layer 33c comprises the fifth layer 32e and the sixth layer 32f. A double layer 33a, presently the radially outermost double layer 33a, is displaced by a groove 22 counter to the preferred rotation direction 10 in relation to the other double layers 33b, 33c counter to the preferred rotation direction.

Figure 5:
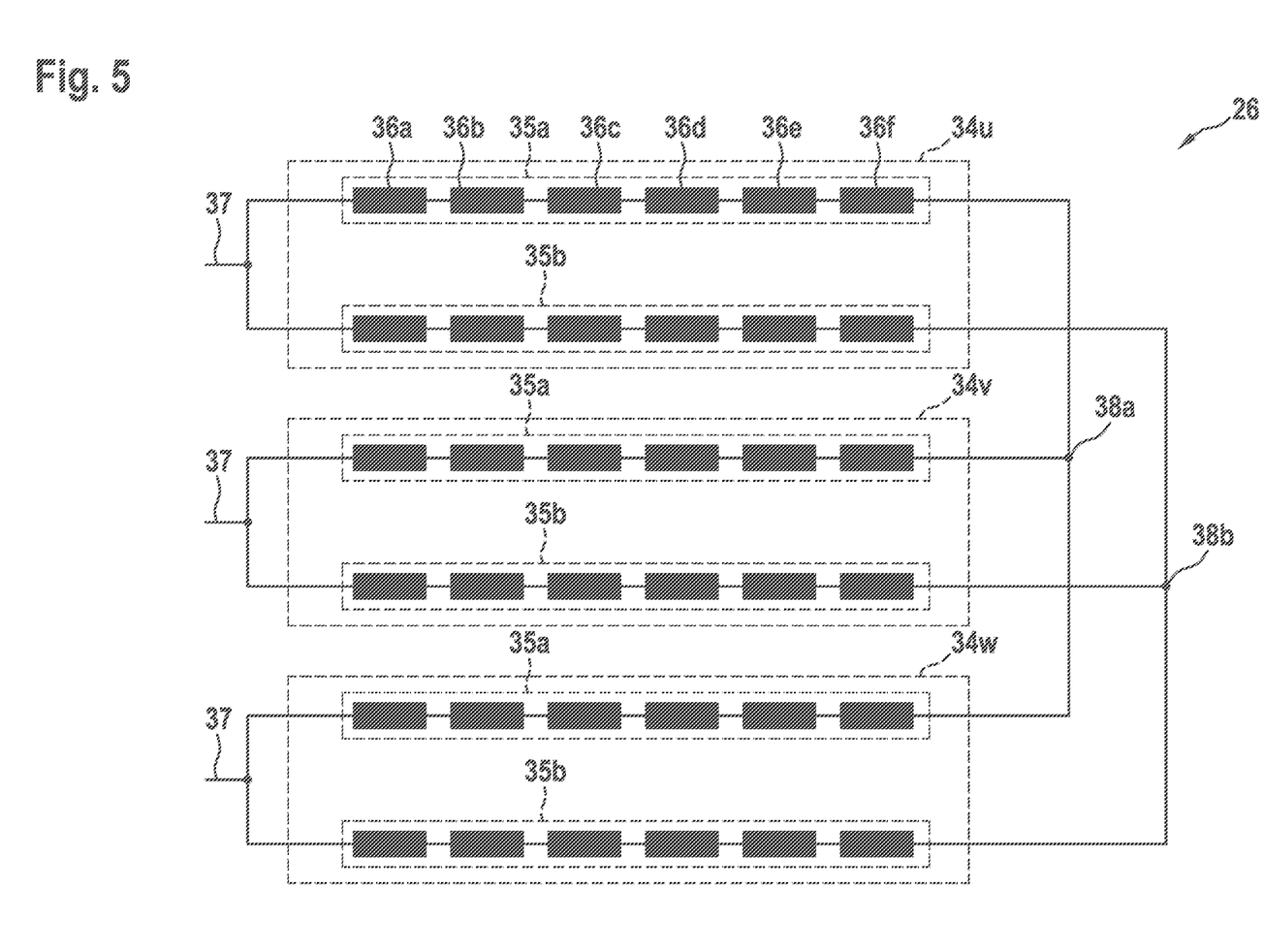
FIG. 5 shows a block circuit diagram of the stator winding according to the first exemplary embodiment.

FIG. 5 shows a block circuit diagram of the stator winding 26 according to the first exemplary embodiment.

The stator winding 23 for each strand U, V, W has a phase winding 34u, 34v, 34w. Each phase winding 34u, 34v, 34w comprises a first sub-winding 35a and a second sub-winding 35b, which in each case configure a current path. Each sub-winding 35a, 35b comprises a number, corresponding to the number of layers L, of conductor sequences 36a-f which are connected in series.

Each phase winding 34u, 34v, 34w is connected to a phase connector 37. The phase windings 34u, 34v, 34w are furthermore wired so as to form two neutral points 38a, 38b, wherein the first sub-windings 35a are wired so as to form the first neutral point 38, and the second sub-windings 35b are wired so as to form the second neutral point 38b. The phase connectors 37 and the neutral points 38a, 38b are also illustrated in FIG. 2.

Figure 6:
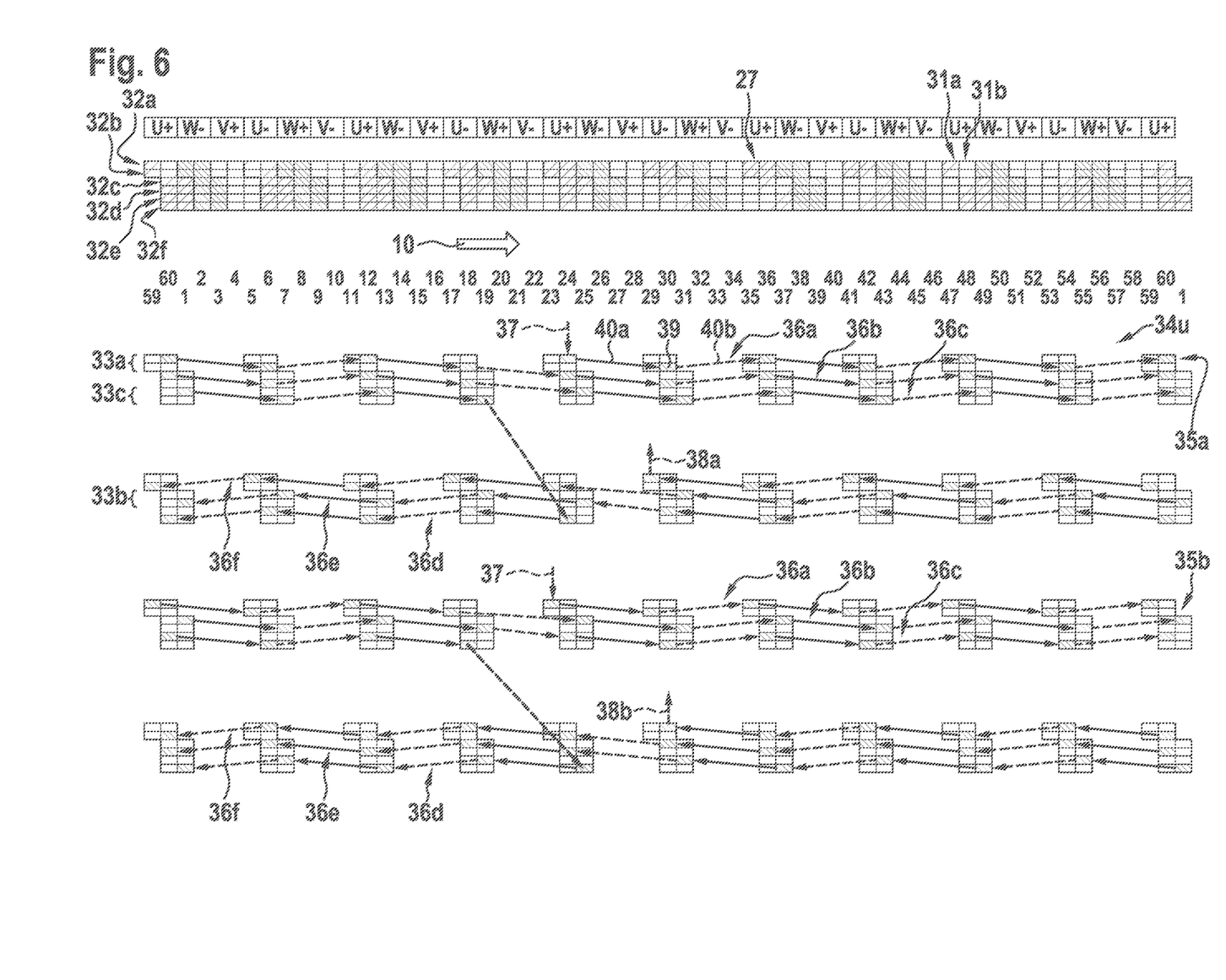
FIG. 6 shows a schematic winding diagram of a phase of the stator winding, according to the first exemplary embodiment.

FIG. 6 shows a winding diagram of a phase U of the stator winding 26 according to the first exemplary embodiment.

The stator winding 26 has 2·P=10 poles, N=3 phases and a hole count q=2. The number of grooves 22 is 2·P·N·q=60. A groove numbering from 1 to 60 is indicated in FIG. 6. Each sub-winding 35a, 35b comprises the internal portions 39 that are disposed within the grooves 22, and connection portions 40, 41 that are disposed on the end sides 24, 25 of the stator core 20 (cf. FIG. 2), and connect in each case in an electrically conductive manner two directly successive internal portions 39 in terms of the current path. The connection portions 40 here are situated on the second end side 25, and the connection portions 41 are situated on the first end side 24. The connection portions 40 are illustrated by solid lines, and the connection portions 41 are illustrated by dashed lines, in FIG. 6.

The stator winding 26 is configured as a wave winding. The conductor sequences 36a-f are in each case configured by a plurality of successive internal portions 39 that are connected in series by the connection portions 40, 41. In the first exemplary embodiment, each conductor sequence 36*a-f* configures a complete encirclement about the stator core 20 in the circumferential direction. The first to third (L/2$^{th}$) conductor sequences 36*a-c* here run in each case along the preferred rotation direction 10, and the fourth to sixth conductor sequences 36*c-f* run in each case counter to the first to third conductor sequences 36*a-c*, thus counter to the preferred rotation direction 10. Each conductor sequence 36*a-f* is disposed in one of the double layers 33*a-c*. Each conductor sequence 36*b-f* which directly succeeds another conductor sequence 36*a-e* in terms of the current path, is disposed in a different sub-winding zone 31*a*, 31*b* than the other conductor sequence 36*a-e*. The conductor sequences 36*a-f* as a result are disposed in an alternating manner in different sub-winding zones 31*a*, 31*b*.

The second sub-winding 35*b* to this extent corresponds to the first sub-winding 35*a*. In the second sub-winding 35*b*, a respective internal portion 39 which lies in the same layer 32*a-f* of the same winding zone 27 as an internal portion 39 of the first sub-winding 35*a*, is disposed in a different sub-winding zone 31*a*, 31*b* than the sub-winding zone 31*a*, 31*b* in which the internal portion 39 of the first sub-winding 35*a* lies.

In both sub-windings 35*a*, 35*b*, the internal portions 39, which are connected directly by a connection portion 40, 41 and are associated with the same conductor sequence 36*a-f*, are mutually spaced apart by q·N=6 grooves.

In the first sub-winding 35*a*, the internal portion 39 of the first conductor sequence 36*a* and the internal portion 39 of the second conductor sequence 36*b*, which is connected directly to the former by a connection portion 41, are mutually spaced apart by q·N=6 grooves. The internal portion 39 of the second conductor sequence 36*b* and the internal portion 39 of the third conductor sequence 36*c*, which is connected directly to the former by a connection portion 41, are mutually spaced apart by q·N+1=7 grooves. The internal portion 39 of the third conductor sequence 36*c* and the internal portion 39 of the fourth conductor sequence 36*d*, which is connected directly to the former by a connection portion 41, are mutually spaced apart by q·N−1=5 grooves. The internal portion 39 of the fourth conductor sequence 36*d* and the internal portion 39 of the fifth conductor sequence 36*e*, which is connected directly to the former by a connection portion 41, are mutually spaced apart by q·N−1=5 grooves. The internal portion 39 of the fifth conductor sequence 36*e* and the internal portion 39 of the sixth conductor sequence 36*f*, which is connected directly to the former by a connection portion 41, are mutually spaced apart by q·N+2=8 grooves.

In the second sub-winding 35*b*, the internal portion 39 of the first conductor sequence 36*a* and the internal portion 39 of the second conductor sequence 36*b*, which is connected directly to the former by a connection portion 41, are mutually spaced apart by q·N+2=8 grooves. The internal portion 39 of the second conductor sequence 36*b* and the internal portion 39 of the third conductor sequence 36*c*, which is connected directly to the former by a connection portion 41, are mutually spaced apart by q·N−1=5 grooves. The internal portion 39 of the third conductor sequence 36*c* and the internal portion 39 of the fourth conductor sequence 36*d*, which is connected directly to the former by a connection portion 41, are mutually spaced apart by q·N+1=7 grooves. The internal portion 39 of the fourth conductor sequence 36*d* and the internal portion 39 of the fifth conductor sequence 36*e*, which is connected directly to the former by a connection portion 41, are mutually spaced apart by q·N+1=7 grooves. The internal portion 39 of the fifth conductor sequence 36*e* and the internal portion 39 of the sixth conductor sequence 36*f*, which is connected directly to the former by a connection portion 41, are mutually spaced apart by q·N=6 grooves.

As can furthermore be derived from FIG. 6, the first conductor sequences 36*a* of the sub-windings 35*a*, 35*b* are connected to the phase connector 37. The sixth conductor sequences 36*f* of the sub-windings 35*a*, 35*b* are connected to the neutral points 38*a*, 38*b*, wherein the sixth conductor sequence 36*f* of the first sub-winding 35*a* here is connected to the first neutral point 38*a*, and the sixth conductor sequence 36*f* of the second sub-winding 35*b* is connected to the second neutral point 38*b*.

The phase windings 34*v*, 34*w* of the strands V, W correspond to the previously described phase winding 34*u* of the strand U, and are disposed in relation to the strand U so as to be displaced by q·N=6 grooves in the circumferential direction.

With reference to FIG. 2, the stator winding 26 by way of a multiplicity of shaped conductors 42 is configured as a hairpin winding. The shaped conductors 42 are configured from a metal rod and have a rectangular or radiused rectangular cross section. One part of the shaped conductors 42 has two straight portions 43, 44 which extend in the axial direction within a respective groove 22 and configure the internal portions 39. The straight portions 43, 44 on a first end side 24 of the stator core 20 are connected to one another by way of an end coil portion 45, the latter configuring the connection portion 40*b*. The end coil portion 45 is configured so as to be integral to the straight portions 43, 44. On a second end side 25 of the stator core 20, each straight portion 43, 44 is adjoined by an end portion 46. The end portions 46 of two respective shaped conductors 42 are mechanically connected to one another in electrically conductive and materially integral manner, in particular by welding. Two end portions 46 that are connected to one another configure a connection portion 40*a* on the second end side 25. The shaped conductors, which are not illustrated in detail and are connected to one of the phase connectors 37, or one of the neutral points 38*a*, 38*b*, respectively, have only one straight portion and one end portion, the latter conjointly with the end portion 46 of a shaped conductor that has two straight portions 43, 44 configuring a connection portion 40*a* on the second end side 25.

Figure 7:
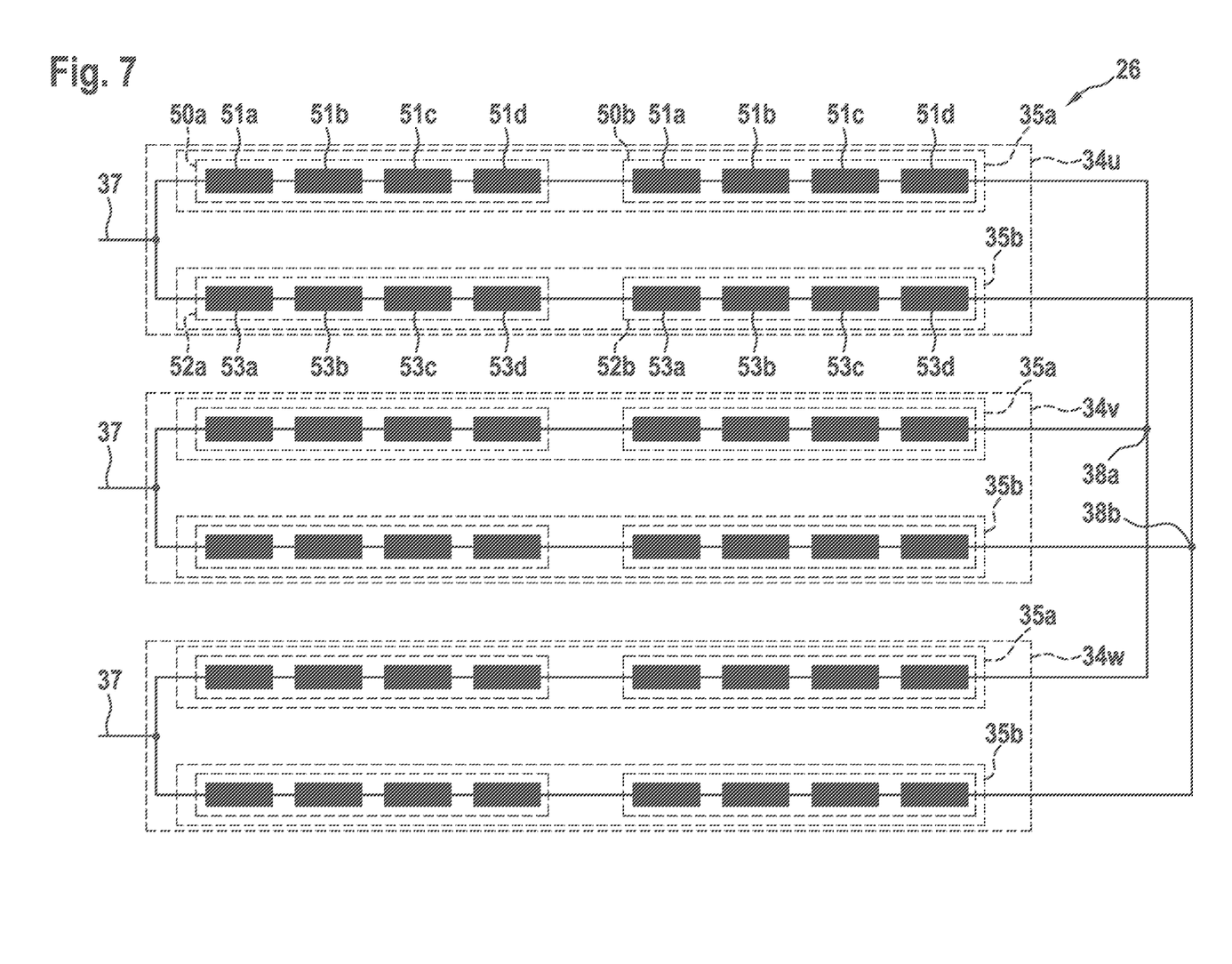
FIG. 7 shows a block circuit diagram of the stator winding of the stator according to the invention, according to a second exemplary embodiment.

FIG. 7 shows a block circuit diagram of the stator winding 26 according to a second exemplary embodiment of a stator 3. With the exception of the variances described hereunder, all embodiments pertaining to the further exemplary embodiment can be applied to the second exemplary embodiment. Identical or functionally equivalent components are provided with identical reference signs.

In the second exemplary embodiment, the stator winding 26 is a combined wave/loop winding. The stator winding 26 comprises the first sub-winding 35*a* of a respective phase winding 34*u*, 34*v*, 34*w* a first set 50*a* of first to fourth (P$^{th}$) conductor sequences of the first type 51*a-d* that are successive in the sequence of their designation in terms of the current path. Moreover, the first sub-winding 35*a* comprises a second set 50*b* of first to fourth (P$^{th}$) conductor sequences of the first type 51*a-d*.

The second sub-winding 35*b* of the respective phase winding 34*u*, 34*v*, 34*w* comprises a first set 52*a* of first to fourth (P$^{th}$) conductor sequences of the second type 53*a-d* that are successive in the sequence of their designation in terms of the current path. Moreover, the second sub-winding 35b comprises a second set 52b of first to fourth ($P^{th}$) conductor sequences of the second type 53a-d.

The number of sets 50a, 50b, 52a, 52b of a respective sub-winding 35a, 35b here corresponds to the hole count q.

Figure 8:
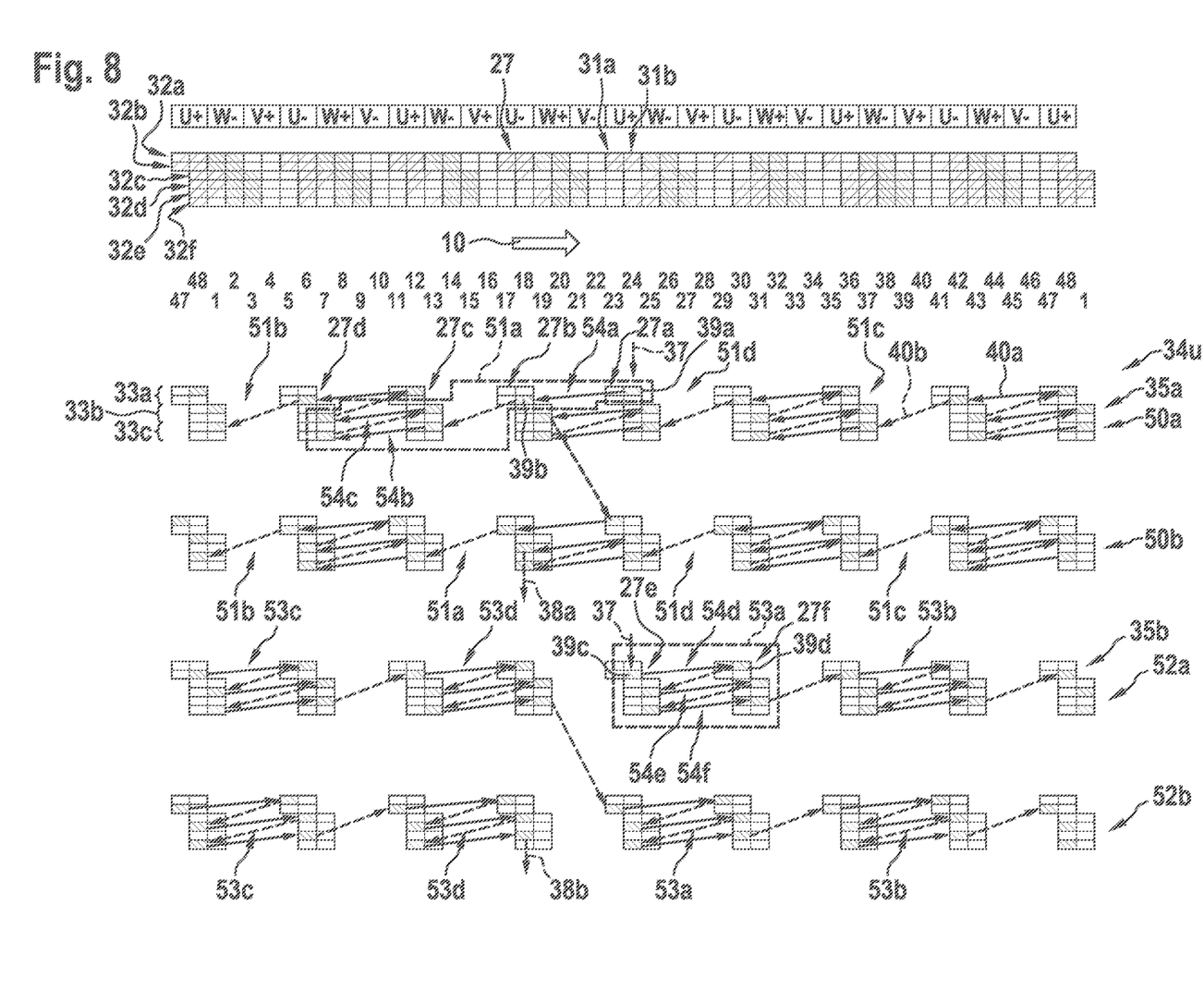
FIG. 8 shows a schematic winding diagram of a phase of the stator winding, according to the second exemplary embodiment.

FIG. 8 shows a winding diagram of a phase U of the stator winding 26 according to the second exemplary embodiment.

The stator winding 26 according to the second exemplary embodiment has 2·P=8 poles, and accordingly has 48 grooves 22.

Each conductor sequence of the first type 51a-d is disposed in first to fourth directly adjacent winding zones 27a-d for the same strand U, and comprises first to third $[(L/2)^{th}]$ pairs 54a-c of one first internal portion 39a and one second internal portion 39b. The pairs 54a-c are designated according to their sequence along the current path.

The first internal portions 39a and the second internal portions 39b are disposed in different layers 32a-f of the same double layer 33a-c. The first pair 54a is disposed in the first double layer 33a, the second pair 54b is disposed in the third $[(L/2)^{th}]$ double layer 33c, and the third pair 54c is disposed in the second double layer 33b. In general terms, the third to $(L/2)^{th}$ pairs are disposed in the second to $[(L/2)-1]^{th}$ double layer.

The third winding zone 27c, in which the internal portions 39a, 39b of the first to third conductor sequences of the first type 51a-c $[(P-1)^{th}]$ are disposed, is the first winding zone 27a in which the conductor sequence 51b-d which succeeds the conductor sequence of the first type 51a-c in terms of the current path is disposed. Accordingly, the fourth winding zone 27d, in which the internal portions 39a, 39b of the first to third $[(P-1)^{th}]$ conductor sequences of the first type 51a-c are disposed, is the second winding zone 27b in which the conductor sequence of the first type 51b-d, which succeeds the conductor sequence of the first type 51a-c in terms of the current path, is disposed.

Each conductor sequence of the second type 53a-d is disposed in two directly adjacent winding zones 27e, 27f for the same strand U, and comprises first to third $[(L/2)^{th}]$ pairs 54d-f of one first internal portion 39c and one second internal portion 39d. The pairs 54d-f are designated according to their sequence along the current path.

The first and second internal portions 39c, 39d are disposed in different layers 32a-f of the double layer 33a-c, the latter corresponding to the designation of the pair 54d-f. The first to third $[(P-1)^{th}]$ conductor sequences of the second type 53a-c by way of one of the connection portions 40b are connected to the conductor sequence of the second type 53b-d which succeeds along the current path. The succeeding conductor sequence of the second type 53b-d is disposed in two directly adjacent winding zones 27 for the same strand U.

The first and second sub-windings 35a, 35b run about the stator core 20 in opposite circumferential directions, wherein the second sub-winding 35b runs along the preferred rotation direction 10.

In the second exemplary embodiment, the first internal portion 39a, 39c of the pairs 54a-f is disposed in one of the layers 32a-f of the double layer 33a-c, and the second internal portion 39b, 39d of the pairs 54a-f is disposed in the other layer 32a-f of the double layer.

Figure 9:
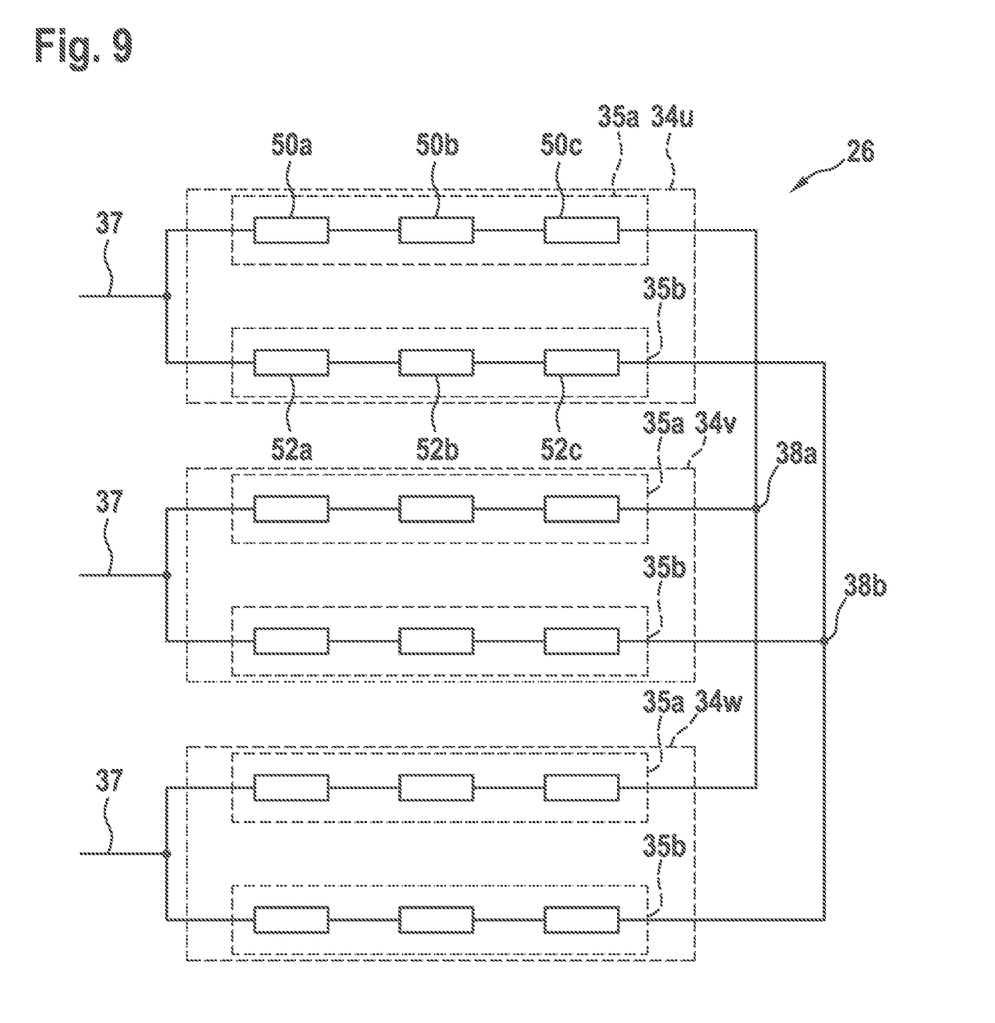
FIG. 9 shows a block circuit diagram of the stator winding of the stator according to the invention, according to a third exemplary embodiment.

FIG. 9 shows a block circuit diagram of the stator winding 26 according to a third exemplary embodiment of a stator 3. With the exception of the variances described hereunder, all embodiments pertaining to the second exemplary embodiment can be applied to the third exemplary embodiment. Identical or functionally equivalent components are provided with identical reference signs.

In the third exemplary embodiment, the first sub-winding 35a additionally has a third set 50c of conductor sequences of the first type 51a-d, and the second sub-winding 35b additionally has a third set 52c of conductor sequences of the second type 53a-d, wherein the conductor sequences 51a-d, 53a-d are not illustrated for the sake of clarity in FIG. 9.

Figure 10:
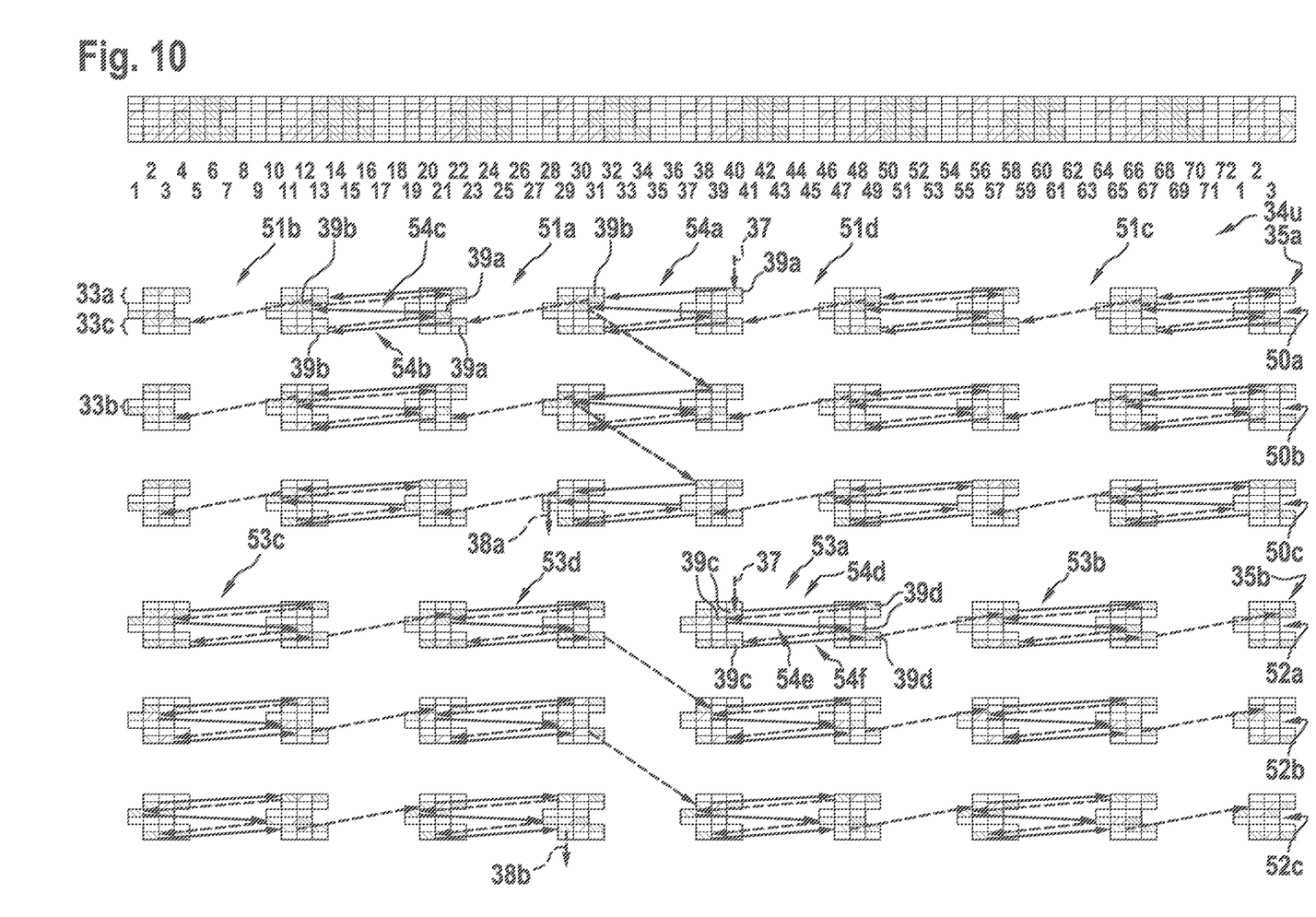
FIG. 10 shows a schematic winding diagram of a phase of the stator winding according to the third exemplary embodiment.

FIG. 10 shows a winding diagram of a phase U of the stator winding 26 according to the third exemplary embodiment.

The stator winding 26 according to the third exemplary embodiment, like the second exemplary embodiment, has 2·P=8 poles, but a hole count q=3. Accordingly, the number of grooves 22 is 72. It can be derived from the increase in the hole count q that each of the third sets 50c, 52c are provided.

In the third exemplary embodiment, the first internal portion 39a, 39c of the pairs 54a, 54c, 54d, 54f with an odd-numbered designation of the conductor sequences 51a-d, 53a-d of a respective sub-winding 35a, 35b is disposed in one of the layers 32a-f of the double layer 33a-c, and the second internal portion 39b, 39d of the pairs 54a, 54c, 54d, 54f with an odd-numbered designation of the conductor sequences 51a-d, 53a-d of the respective sub-winding 35a, 35b is disposed in the other layer of the double layer 33a-c. The first internal portion 39a, 39c of the pairs 54b, 54e with an even-numbered designation of the conductor sequences 51a-d, 54a-d of the respective sub-winding 35a, 35b is disposed in the other layer 39b, 39d of the double layer 33a-c, and the second internal portion 39b, 39d of the pairs 54, 54e with an even-numbered designation of the conductor sequences 51a-d, 53a-d of the respective sub-winding 35a, 35b is disposed in the one layer 32a-f of the double layer 33a-c.

In the third exemplary embodiment, the second double layer 33b in relation to the first double layer 33a and the third double layer 33c is moreover displaced counter to the preferred rotation direction 10.

According to further embodiments, which correspond in each case to one of the embodiments described above, the stator winding 26 is not configured as a hairpin winding but as a round-wire winding.

According to further embodiments, which correspond in each case to one of the embodiments described above, the number of poles is greater or less, wherein the number of the conductor sequences increases or reduces correspondingly.

According to further embodiments, which correspond in each case to one of the embodiments described above, the stator winding 26 has only one neutral point for all of the sub-windings 35a, 35b.

The invention claimed is:

1. A stator for an electric machine, comprising:
a stator core which extends along a longitudinal axis and has a first end side and a second end side that lies opposite the first end side; and
a stator winding, wherein:
  a multiplicity of grooves that are disposed in a circumferential direction are configured in the stator core,
  the stator winding occupies a plurality of winding zones in the multiplicity of grooves,
  the stator winding has a number of N strands and a number of 2·P poles, and the number of grooves is 2·P·N·q, where P, N and q are natural numbers, and q≥2,
  each winding zone extends across at least q+1 of the grooves and is radially subdivided into first to $L^{th}$ layers which are designated according to their sequence in a radial direction, the layers configure first to $(L/2)^{th}$ double layers, wherein an $i^{th}$ double layer comprises a $(2i-1)^{th}$ and a $(2i)^{th}$ layer for all $1 \leq i \leq (L/2)$, where $L \geq 6$ and is even, where L and i are natural numbers, a number of the double layers being less than a remainder of double layers is displaced by at least one groove counter to a pre-defined circumferential direction in relation to the remainder of double layers, each winding zone in the circumferential direction is subdivided into first to $q^{th}$ sub-winding zones which comprise in each case all layers and are designated according to their sequence in the circumferential direction, and the stator winding for a respective strand has a phase winding comprising at least one sub-winding which configures a current path and comprises internal portions that are disposed within the multiplicity of grooves, and connection portions that are disposed on the first end side and the second end side of the stator core and connect in each case in an electrically conductive manner two internal portions which are directly successive in terms of the current path, wherein the at least one sub-winding comprises a plurality of conductor sequences of internal portions which are successive in terms of the current path, each conductor sequence is disposed in one of the double layers and configures a full encirclement of the stator core, first to $L/2^{th}$ of the plurality of conductor sequences run in each case along the circumferential direction along the pre-defined circumferential direction, and $[(L/2)+1]^{th}$ to $L^{th}$ of the plurality of conductor sequences run in each case along a further circumferential direction that is counter to the circumferential direction.

2. The stator according to claim 1, wherein each conductor sequence which directly succeeds another conductor sequence in terms of the current path, is disposed in a different sub-winding zone than the other conductor sequence.

3. The stator according to claim 1, wherein:
a further sub-winding, which corresponds to the sub-winding, is provided, and
a respective internal portion of the further sub-winding, that lies in the same layer of the same winding zone as an internal portion of the sub-winding, is disposed in a different sub-winding zone than the sub-winding zone in which the internal portion of the sub-winding lies.

4. The stator according to claim 1, wherein:
one of the at least one sub-winding comprises a set of first to $P^{th}$ conductor sequences of the first type that are successive in the sequence of their designation in terms of the current path and are in each case disposed in first to fourth directly adjacent winding zones for the same strand,
each conductor sequence of the first type comprises first to $(L/2)^{th}$ pairs of one first of the internal portions and one second of the internal portions, and the pairs are designated according to their sequence along the current path,
the first and the second internal portions are disposed in different layers of the same double layer,
the first pair is disposed in the first double layer, the second pair is disposed in the $(L/2)^{th}$ double layer, and the third pair is disposed in the second double layer, or the third to $(L/2)^{th}$ pairs are disposed in the second to $[(L/2)-1]^{th}$ double layer, the third winding zone, in which the internal portions of the first to $(P-1)^{th}$ conductor sequences are disposed, is the first winding zone in which the conductor sequence that succeeds the conductor sequence in terms of the current path is disposed, and the fourth winding zone, in which the internal portions of the first to $(P-1)^{th}$ conductor sequences are disposed, is the second winding zone in which the conductor sequence that succeeds the conductor sequence in terms of the current path is disposed.

5. The stator according to claim 1, wherein:
one of the at least one sub-winding comprises a set of first to $P^{th}$ conductor sequences of the second type that are successive in the sequence of their designation in terms of the current path and are in each case disposed in two directly adjacent winding zones for the same strand,
each conductor sequence of the second type comprises first to $(L/2)^{th}$ pairs of one first of the internal portions and one second of the internal portions, and the pairs are designated according to their sequence along the current path,
the first and the second internal portions are disposed in different layers of the double layer corresponding to the designation of the pair, and
the first to $(P-1)^{th}$ conductor sequences of the second type by way of one of the connection portions are connected to the succeeding conductor sequence of the second type along the current path, and the succeeding conductor sequence of the second type is disposed in two directly adjacent winding zones for the same strand.

6. The stator according to claim 4, wherein the sub-windings run about the stator core in opposite circumferential directions.

7. The stator according to claim 4, wherein:
the first internal portion of the pairs of the conductor sequences of the or of a respective sub-winding is disposed in one of the layers of the double layer, and the second internal portion of the pairs of the conductor sequences of the or of a respective sub-winding is disposed in the other one of the layers of the double layer, or
the first internal portion of the pairs with an odd-numbered designation of the conductor sequences of the or of a respective sub-winding is disposed in one of the layers of the double layer,
the second internal portion of the pairs with an odd-numbered designation of the conductor sequences of the or of a respective sub-winding is disposed in the other layer of the double layer,
the first internal portion of the pairs with an even-numbered designation of the conductor sequences of the or of a respective sub-winding is disposed in the other layer of the double layer, and
the second internal portion of the pairs with an even-numbered designation of the conductor sequences of the or of a respective sub-winding is disposed in the one layer of the double layer.

8. The stator according to claim 4, wherein:
the or a respective sub-winding comprises in total q sets of the conductor sequences which are in each case disposed in the same sub-winding zone, and
each set that directly succeeds another set of the same sub-winding in terms of the current path, is disposed in a different sub-winding zone than the other set.

9. A drive installation for an electric vehicle comprising:
a stator according to claim 1, wherein the stator is specified for generating a rotating magnetic field;

a converter installation for converting magnetic energy of the rotating field into a rotating output movement of the drive installation, wherein the converter installation has a rotor which conjointly with the stator configures a rotating electric machine such that the rotor is able to be set in a rotating rotor movement which as a function of the rotating field is able to be selectively set to one of two opposite rotation directions; and a transmission portion which is specified for transmitting the rotating rotor movement to the rotating output movement, wherein the converter installation as the preferred rotation direction has one of the two rotation directions of the rotating rotor movement, wherein the preferred rotation direction corresponds to the pre-defined circumferential direction.

10. The drive installation according to claim 9, wherein:

an efficiency of the transmission portion in the preferred rotation direction is higher than in the other one of the rotation directions, and the transmission portion has a gearbox having an asymmetrical design embodiment that determines the preferred rotation direction, and the drive installation has a control installation for the transmission portion, which for the preferred rotation direction has a larger number of selectable operating modes than for the other one of the rotation directions, and the drive installation has a ventilation installation which in the preferred rotation direction has a higher cooling efficiency than in the other one of the rotation directions.

11. A vehicle comprising the drive installation according to claim 9, which is specified for driving the vehicle.

12. A stator for an electric machine, comprising:

a stator core which extends along a longitudinal axis and has a first end side and a second end side that lies opposite the first end side; and a stator winding, wherein:

a multiplicity of grooves that are disposed in a circumferential direction are configured in the stator core, the stator winding occupies a plurality of winding zones in the multiplicity of grooves, the stator winding has a number of N strands and a number of 2·P poles, and the number of grooves is 2·P·N·q, where P, N and q are natural numbers, and $q \geq 2$, each winding zone extends across at least q+1 of the grooves and is radially subdivided into first to $L^{th}$ layers which are designated according to their sequence in a radial direction, the layers configure first to $(L/2)^{th}$ double layers, wherein an $i^{th}$ double layer comprises a $(2i-1)^{th}$ and a $(2i)^{th}$ layer for all $1 \leq i \leq (L/2)$, where $L \geq 6$ and is even, where L and i are natural numbers, a number of the double layers being less than a remainder of double layers is displaced by at least one groove counter to a pre-defined circumferential direction in relation to the remainder of double layers, each winding zone in the circumferential direction is subdivided into first to $q^{th}$ sub-winding zones which comprise in each case all layers and are designated according to their sequence in the circumferential direction, and the stator winding for a respective strand has a phase winding comprising at least one sub-winding which configures a current path and comprises internal portions that are disposed within the multiplicity of grooves, and connection portions that are disposed on the first end side and the second end side of the stator core and connect in each case in an electrically conductive manner two internal portions which are directly successive in terms of the current path, wherein one of the at least one sub-winding comprises a set of first to $P^{th}$ conductor sequences of the first type that are successive in the sequence of their designation in terms of the current path and are in each case disposed in first to fourth directly adjacent winding zones for the same strand, each conductor sequence of the first type comprises first to $(L/2)^{th}$ pairs of one first of the internal portions and one second of the internal portions, and the pairs are designated according to their sequence along the current path, the first and the second internal portions are disposed in different layers of the same double layer, the first pair is disposed in the first double layer, the second pair is disposed in the $(L/2)^{th}$ double layer, and the third pair is disposed in the second double layer, or the third to $(L/2)^{th}$ pairs are disposed in the second to $[(L/2)-1]^{th}$ double layer, the third winding zone, in which the internal portions of the first to $(P-1)^{th}$ conductor sequences are disposed, is the first winding zone in which the conductor sequence that succeeds the conductor sequence in terms of the current path is disposed, and the fourth winding zone, in which the internal portions of the first to $(P-1)^{th}$ conductor sequences are disposed, is the second winding zone in which the conductor sequence that succeeds the conductor sequence in terms of the current path is disposed.

* * * * *